United States Patent [19]
Roos

[11] B 3,982,276
[45] Sept. 21, 1976

[54] METHOD OF COPYING MAGNETIC RECORDINGS PROVIDED ON A MAGNETIZABLE MEDIUM HAVING A GREATER COERCIVE FORCE BEFORE THAN AFTER RECORDING

[75] Inventor: Jan Roos, Eindhoven, Netherlands

[73] Assignee: U.S. Philips Corporation, New York, N.Y.

[22] Filed: Apr. 18, 1974

[21] Appl. No.: 461,874

[44] Published under the second Trial Voluntary Protest Program on January 27, 1976 as document No. B 461,874.

Related U.S. Application Data
[63] Continuation of Ser. No. 297,716, Oct. 16, 1972.

[30] Foreign Application Priority Data
Oct. 21, 1971 Netherlands ..................... 7114533

[52] U.S. Cl. ................................................ 360/17
[51] Int. Cl.² .......................................... G11B 5/86
[58] Field of Search ................................. 360/16, 17

[56] References Cited
UNITED STATES PATENTS

| | | | |
|---|---|---|---|
| 2,738,383 | 3/1956 | Herr et al. ........................... | 360/17 |
| 3,465,105 | 9/1969 | Kumada et al. ...................... | 360/17 |

*Primary Examiner*—Robert S. Tupper
*Attorney, Agent, or Firm*—Frank R. Trifari; Carl P. Steinhauser

[57] ABSTRACT

A method of copying magnetic information from a master tape on a slave by contacting the tapes with each other in a magnetic field. In order to be able to make copies on high-coercive copy tapes, a master tape is used on which information can be recorded in a low-coercive condition and can be used for copying in a high-coercive condition.

2 Claims, 7 Drawing Figures

METHOD OF COPYING MAGNETIC RECORDINGS PROVIDED ON A MAGNETISABLE MEDIUM HAVING A GREATER COERCIVE FORCE BEFORE THAN AFTER RECORDING

This is a continuation of application Ser. No. 297,716, filed Oct. 16, 1972.

The invention relates to a method of copying magnetic recordings provided on a first magnetisable recording medium on a second magnetisable recording medium by contacting the magnetic surfaces of the first magnetisable medium and of the second magnetisable medium with each other, subjecting them to a magnetic auxiliary field and separating them from each other.

A magnetisable medium is generally to be understood to mean a carrier, for example a tape or a disc, on which a coating of a magnetisable material, usually dispersed in a binder, is provided.

It is known from U.S. Pat. No. 2,738,383 that the information transfer which occurs when a high coercive magnetic medium provided with a magnetic recording is contacted in a magnetic auxiliary field with a low-coercive magnetisable medium which is not provided with a magnetic recording can be used for copying magnetic tapes. Several machines are based on this socalled "anhysteretic" copying method which can make contact copies of video tapes at high speed. (See for example Journal of the S.M.P.T.E., volume 78, number 9, September 1969, pp. 709 – 711). Essential for the anhysteretic copying method is that the coercive force of the tape to be copied (the "master tape") is larger than the coercive force of the tape on which is copied (the "slave"), and that the field strength of the magnetic auxiliary field which is used to improve the transfer characteristic, and in particular to linearize it, is larger than the coercive force of the slave but smaller than the coercive force of the master tape. It is known, for example, that in this manner copies can be made on a tape having a coercive force ob 250 Oe, from a master tape having a coercive force of 600 Oe which using a transfer field having a field strength of 350 Oe.

In the field of video cassette recorders, however, the development is in the direction of the use of tapes having coercive forces considerably higher than 250 Oe. This development has to do with the condition that the information packing density of a magnetisable medium increases with the coercive force of the magnetic material used, so that when using tapes having higher coercive forces, either the cassettes can be smaller, or the play-back time longer. Another aspect of the use of tape having higher coercive forces is that the signal-to-noise ratio becomes more favourable, as a result of which the picture quality of a TV programm recorded on such a tape and then played back is improved.

It has so far not been possible, however, to make copies on such high-coercivity tapes by means of the anhysteretic copying method, since tapes having a still higher coercive force for use as master tapes cannot be written well enough with the nowadays magnetic heads.

This problem is solved by the method according to the invention which is characterized in that the recordings to be copied are provided on the first magnetisable medium when this is in a condition with low coercive force and that the copying on the second magnetisable medium takes place in a condition in which the first magnetisable medium has a high coercive force, all this on the condition that upon copying the coercive force $H_{c1}$ of the first magnetisable medium, the coercive force $H_{c2}$ of the second magnetisable medium and the field strength H of the magnetic auxiliary field fulfill the requirement:

$$aH_{c2} < H < (H_{c1})/a$$

with $1 < a < 2$, in which the choice of $a$ is determined by the steepness of the remanence curves of the first and the second magnetisable medium, as will be explained hereinafter.

A first embodiment of the method according to the invention is characterized in that for the first magnetisable medium a magnetic material is used having the property that a first coercive force is associated with a first temperature and that a - considerably higher - coercive force is associated with a second temperature, the recordings to be copied being provided on the first medium at the first temperature and the copying being carried out at the second temperature.

The same material may be used for the magnetic material for both the first medium (the master tape) and the second medium (the slave). In that case, the master tape, after the recording to be copied has been provided on it at the first temperature, should be brought separately at the second temperature so as to increase the coercive force, while the slave is brought or maintained, respectively, at a temperature with which a condition with low coercive force is associated, before the copying process, which is characterized by contacting the master tape and the slave and leaving a magnetic auxiliary field to act on them, can be carried out. A drawback of this method is that with an optimum process such high requirements are imposed upon a master tape suitable for the present purpose that already for economic considerations it is not practical to use the same magnetic material for the slave as for the master tape. Moreover it is necessary when using the same tapes (and thus necessarily unequal temperatures during copying) to maintain the contact period short so that no temperature compensation occurs during copying. This is in contrast with the recognition that the contact duration may not be too short for a good transfer.

A second embodiment of the method according to the invention is characterized in that for the second magnetisable medium a magnetic material is used having the property that the coercive force in the said temperature range is substantially independent of temperature and that after providing the recordings to be copied on the first magnetisable medium at the first temperature, the two media are contacted and collectively brought to the second temperature.

The advantage of this is that, since the two media are at the same temperature during the copying process, no difference in shrinkage or elongation of the carrier material can occur during the various stages of the process, which is possible indeed in the above described method.

A further advantage is that the two magnetisable media can be wound on one and the same reel (so-called bifilar winding) and can then be exposed to the transfer field in a space which is maintained at the second temperature.

Cobalt-doped iron oxides have been found to be very suitable in particular to serve as a magnetic material for the master tape in one of the above-described methods. The coercive force of $\gamma$-Fe$_2$O$_3$ doped with 3 at. % cobalt, dispersed in a lacquer layer and provided on a carrier increases from a value of 600 Oe at room temperature, for example, to a value of 2000 Oe at −75°C.

A favourable effect will be reached in general with a material which satisfies the formula $(Co_xFe_{1-x})_2O_3$, with $0.01 < x < 0.1$, i.e. with $\gamma$-$Fe_2O_3$ which contains between 1 and 10 at. % cobalt.

A further embodiment of the method according to the invention is characterized in that for the magnetic material for the first medium is used a material which satisfies the general formula $M_5R$, where M is at least one transfer metal of the first long period and R is at least one rare earth metal, that said medium, before the recordings to be copied are provided on it, is subjected to hydrogen gas under pressure and that the hydrogen gas pressure is removed before copying is carried out.

It is known that the coercive force of $SmCo_5$ like materials can be considerably reduced by exposing it to hydrogen gas under pressure and that the original coercive force after removing the hydrogen gas pressure returns after a short time. Within the scope of the present invention this property can advantageously be used. It is a particular advantage that copying can be carried out normally at room temperature.

The invention will be described in greater detail, by way of example, with reference to the drawing.

Figure 3:
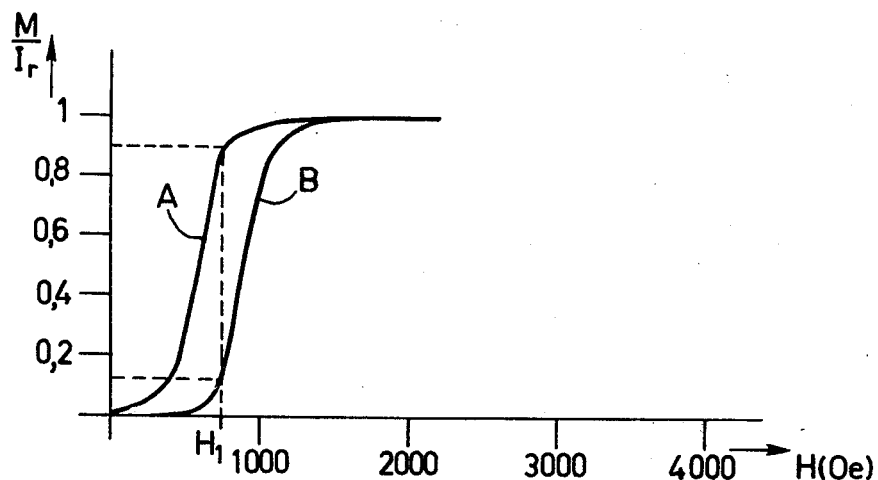
Figure 4:
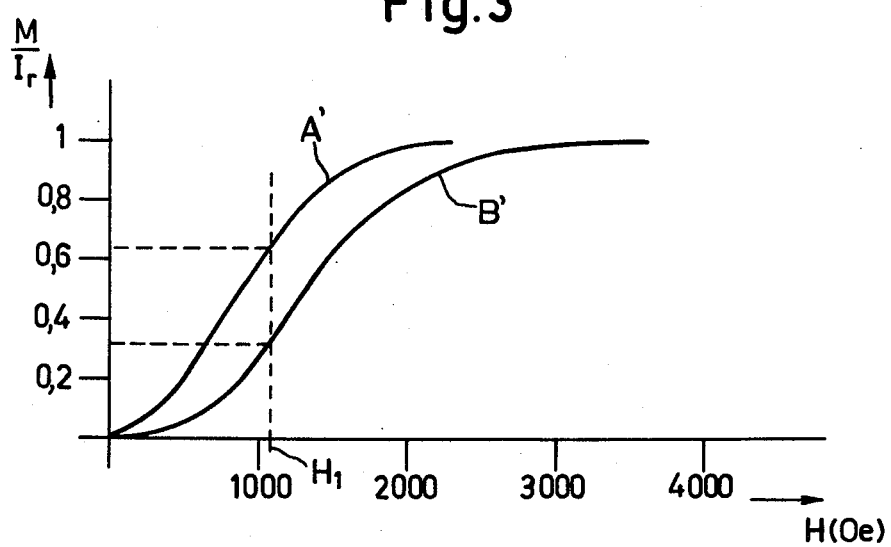

FIGS. 3 and 4 each show for a particular choice of the magnetic material for master and slave the associated remanence curves.

Figure 5:
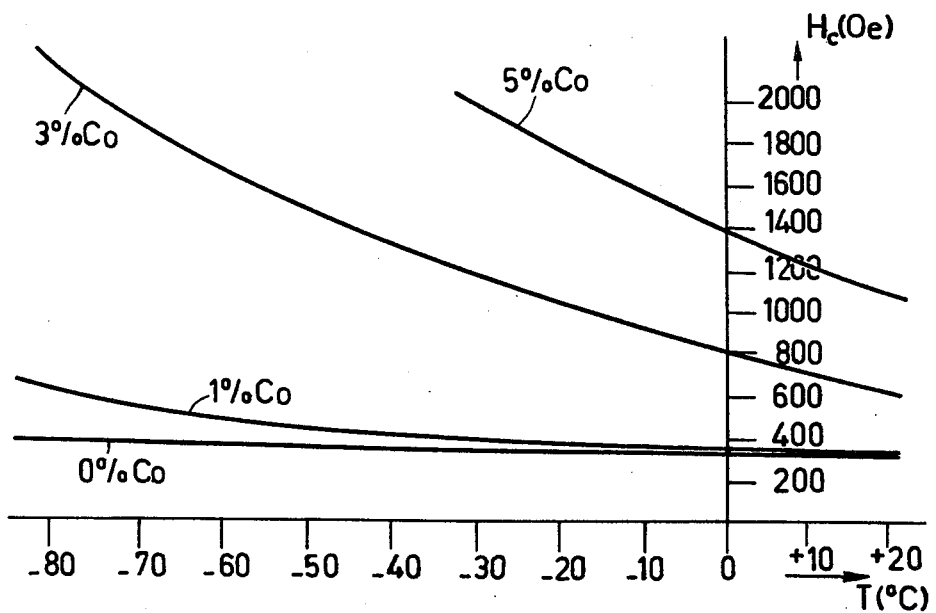

FIG. 5 shows the relationship between temperature T and coercive force $H_c$ of $\gamma$—$Fe_2O_3$ tapes doped with different quantities of cobalt.

Figure 6:
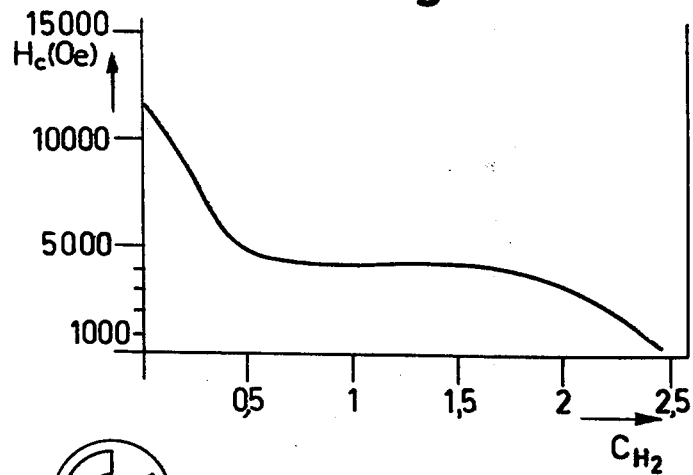

FIG. 6 shows the relationship between the hydrogen concentration $C_{H_2}$ and the coercive force $H_c$ of $SmCo_5$.

Figure 7:
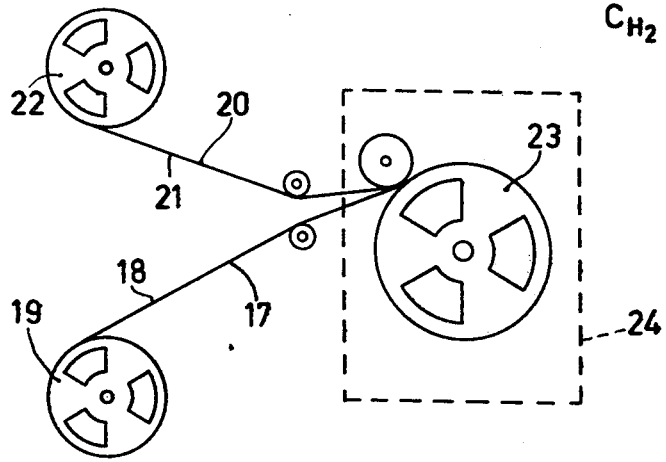

FIG. 7 shows a special embodiment of a device for using the copying process acoording to the invention.

Figure 1:
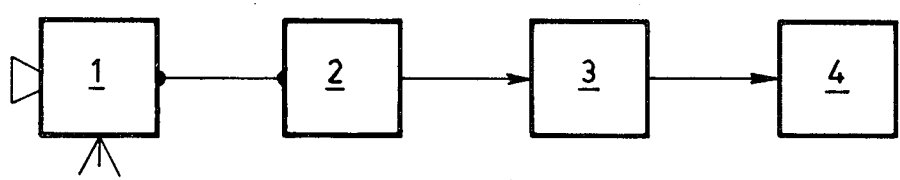
FIG. 1 shows diagrammatically the steps occurring in a copying process of the present type.

FIG. 1 shows diagrammatically the steps occurring in the so-called contact copying of video tapes. The output signal of the camera 1 is recorded on a video recorder 2 in mirror image. Recorder 2 supplies a master tape of which copy tapes are manufactured in the copying machine 3 and which are finally distributed (4).

Figure 2:
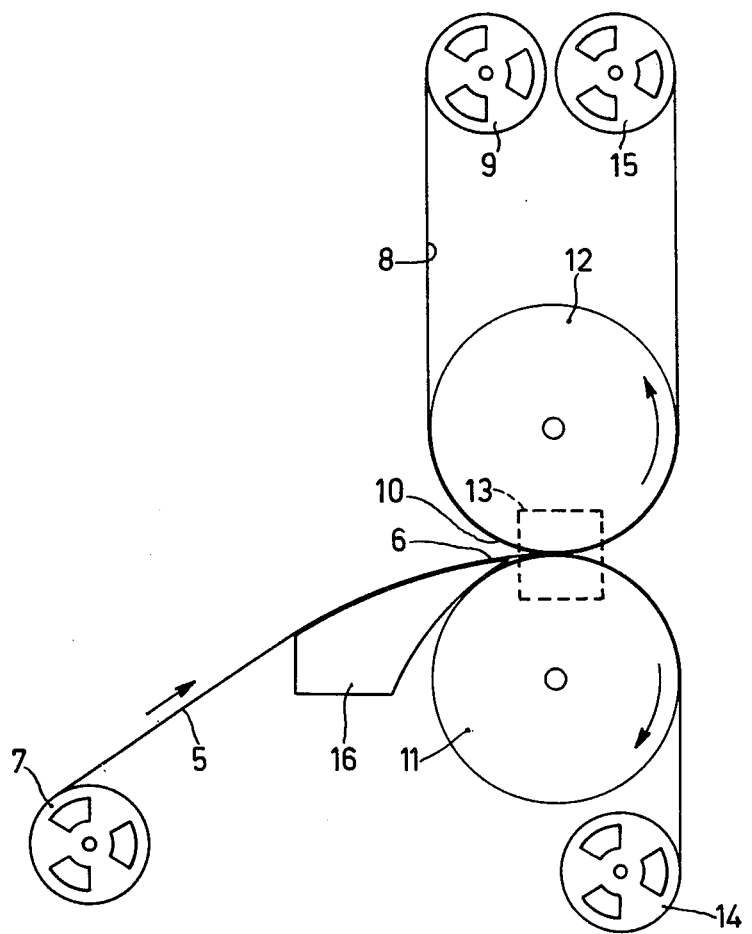
FIG. 2 shows a device for using the copying process according to the invention.

The operation of the copying machine according to the anhysteretic copying process is shown in FIG. 2. A master tape 5 in the magnetic surface 6 of which a recording has been recorded, is supplied from the supply reel 7. The magnetic surfaces 6 and 10, respectively, of the master tape 5 and slave 8, respectively, are contacted with each other between the pressure rollers 11 and 12. While they are in contact with each other, they are subjected to the influence of a magnetic transfer field which may be, for example, transverse to the direction of travel of the tapes, in the region 13 shown in broken lines. The transfer field is generally an alternating field having a frequency which is chosen in accordance with the speed at which the tapes are transported and with a maximum field strength H which on the one hand is larger than the coercive force $H_{c2}$ of the copy tape 8 but on the other hand smaller than the coercive force $H_{c1}$ of the master tape 5. The requirement that $aH_c < H < (H_{c1})/a$ where $1 < a < 2$, must be fulfilled in particular. It is expressed by means of the factor $a$ that with a given $H_{c1}$ and $H_{c2}$ it also depends upon the steepness of the remanence curve of master tape and slave whether effective copying is possible.

This will become apparent with reference to FIGS. 3 and 4.

FIG. 3 shows the remanence curves A and B of two different magnetic tapes. It will be seen that if the tape with which the remanence curve B is associated is used as the master tape and the tape with which the remanence curve A is associated is used as the slave, it is possible to choose the value of the transfer field $H_1$ in such manner that during the copying process the master tape is erased as little as possible by the transfer field (in the case shown for approximately 10 percent) and that the slave is written as well as possible (in the case shown for approximately 90 percent). This means that as a result of the comparatively large steepness of the remanence curves the ratio of the coercive forces of the tapes represented by the curves A and B need be only slightly larger than 1 to enable effective copying.

This is quite different in the case shown in FIG. 4. The remanence curves A' and B' are much less steep in this case. Although the ratio of the coercive forces of the tapes represented by the curves A' and B' corresponds substantially to the ratio of the coercive forces of the tapes represented by the curves A and B in FIG. 3, the copying effect is much worse than in the case shown in FIG. 3. When using the optimum chosen field $H'_1$ as aa transfer field, approximately 40 percent of the master tape will be erased and the slave will be written for approximately 70 percent. When using material having such flat remanence curves, said copying effect can be improved only when the ratio of the coercive forces of the master tape and copy tape is increased. That is to say when, for example, a master tape is used with which a remanence curve is associated which is shifted to the right relative to the curve B'. However, in order to write such a master tape readily, a higher writing field is necessary. Such high writing fields, however, cannot be realized with the nowadays magnetic heads, with short wavelengths.

So it appears from the above that the value of the factor $a$ in the inequality of $aH_{c2} < H < (H_{c1})/a$ depends upon the steepness of the remanence curve. It appears notably that the steeper the curves, the smaller the factor $a$ may be.

The steepness itself of the remanence curves depends inter alia upon the uniformity of the magnetic particles used for the coating of the tape and on the way in which the magnetic particles are dispersed in the binder.

Referring back to FIG. 2 it is to be noted that after copying the information from the master tape to the slave in the above-described conditions, the master tape is transported to the supply reel 14 and the slave to the supply reel 15. It may furthermore be noted that it is known per se to contact the master tape during the transport from the supply reel 7 to the supply reel 14 with more than one slave as a result of which a multiple copying process can be realized.

If the anhysteristic copying method were to be used to make copies on tapes having a coercive force of, for example, 1000 Oe, a master tape is necessary for this purpose having a coercive force from 1500 to 2000 Oe dependent upon the remanence curves of the tapes to be used, as explained above. Such a high-coercive master tape, however, cannot be written well enough with the present-day magnetic heads. According to the invention this problem can be solved when it is ensured that the master tape upon writing is in a condition with low coercive force and can hence well be written, and upon copying is in a condition with high-coercive force and hence is influenced as little as possible by the auxiliary magnetic field to be applied.

A first possibility to realize this is to use tapes the coercive force of which is strongly temperature-dependent. This will be explained with reference to FIG. 5 in which the temperature is plotted on the horizontal axis and the coercive force measured at that temperature is plotted on the vertical axis. The measurements were carried out on four $\gamma$-$Fe_2O_3$ tapes which were doped with 0, 1, 3 and 5 at .% cobalt, respectively. It is obvious that the coercive force of the non-doped $\gamma$-$Fe_2O_3$ tape in the temperature range shown is substantially independent of the temperature, whereas the coercive force of the cobalt-doped $\gamma$-$Fe_2O_3$ tapes strongly increases when the temperature decreases. The tape doped with 3 % cobalt can be written, for example, at room temperature (the coercive force at room temperature is 600 Oe) and be cooled to a temperature of $-70$ °C (at which temperature the coercive force is 1800 Oe) immediately before the anhysteretic copying on a copy tape takes place.

A method of manufacturing cobalt doped $\gamma$-$Fe_2O_3$ tapes will be described hereinafter by way of example.

A cobalt-containing compound, for example $CoCl_2.6H_2O$ is dissolved in water and mixed with $\gamma$-$Fe_2O_3$ powder (the preparation of which is known per se from literature). This mixture is sieved and after adjusting the pH at 8.5 by the addition of $NH_4OH$, the mixture is stirred for 30 minutes. The solid constituents are then filtered, washed and dried. The filtrate is first heated to 425° C in a reducing atmosphere, as a result of which the cobalt-containing compound changes into cobalt oxide, and is then heated in an oxidizing atmosphere. A cobalt-doped $\gamma$-$Fe_2O_3$ powder is finally obtained which consists of $\gamma$-$Fe_2O_3$ particles in which a small part of the iron atoms is replaced by cobalt atoms. This powder is mixed with a binder and provided on a carrier in a thin layer.

Referring back to FIG. 2 it is furthermore to be noted that if both for the master tape and for the slave a magnetic material is used the coercive force of which increases when the temperature decreases, and in particular when the same material is used for both tapes, such measures should be taken that only the master tape is cooled. For that purpose, in the device shown in FIG. 2 the master tape 5 is passed over a cooled metal shoe 16.

When, however, a magnetic material is used for the slave the coercive force of which is not or only slightly temperature-dependent, the device shown in FIG. 6 may advantageously be used. The master tape 17 and the copy tape 20 in this case are supplied from the supply reels 19 and 22 respectively, with the magnetic surfaces 18 and 21, respectively, brought in intimate contact and together wound on the reel 23. The latter is placed in a space 24 which can be cooled to a desired low temperature. A magnetic auxiliary field can also be produced in said space, for example, by an electromagnetic coil (not shown) present around the space. Since the master tape and the slave during the copying process shown in FIG. 6 are at the same temperature, no difference in shrinkage or elongation of the respective carriers can occur, which benefits the exactitude of the copying process.

Two experiments have been carried out in these conditions of which the results are stated below.

1. Signals of a wavelength of 6, 12 and 48 $\mu$m, respectively, were written at room temperature on a $\gamma$-$Fe_2O_3$ tape (the master tape) doped with 5 % cobalt. The information thus provided was anhysteretically copied at a temperature below $-100$ °C on a non-doped $\gamma$-$Fe_2O_3$ tape (the slave) in which a transfer field with a field strength of 2000 Oe was used. Upon reading the slave at room temperature it was found that as a result of copying a loss relative to the signal on the master tape had occurred which varied in value from $-6$ dB to $-3$ dB for the signal with the smallest and the largest wavelength, respectively.

2. Signals with a wavelength of 3, 6, 12 and 24 $\mu$m, respectively, were written at room temperature on a $\gamma$-$Fe_2O_3$ tape (the master tape) doped with 3 % cobalt. The information thus provided was anhysteretically copied at a temperature below $-100$ °C on a non-doped $\gamma$-$Fe_2O_3$ tape (the slave), in which a transfer field with a field strength of 1500 Oe was used. Upon reading the slave it was found that as a result of copying a loss with respect to the signal on the master tape had occurred which varied in value from $-8$ dB for the signal having the smallest wavelength to $-4$ dB for the signal having the largest wavelength.

A second possibility of writing a master tape in a condition with low coercive force and copying in a condition with high coercive force is offered by the use of $SmCo_5$ or a similar intermetallic compound for the magnetic material of the coating.

The intermetallic compounds which satisfy the general formula $M_5R$, wherein M is at least one transfer material of the first long period, and wherein R is at least one rare earth material, constitute a group of magnetisable materials having a hexagonal crystal structure, a high single-axis crystal anisotropy, and in general a high coercive force. This is known, for example, from "Journal of Applied Physics" 38, p. 1001 (1967), in which it is described in particular how the said compounds can serve as raw materials for fine-particles-magnets. It is also known that the coercive force of the said $M_5R$ compounds can be reduced by exposing the relevant material to hydrogen gas under pressure. It has been found that as the hydrogen concentration in the material increases, the coercive force decreases. This is illustrated in FIG. 5 with reference to the intermetallic compound $SmCo_5$, in which Figure the hydrogen concentration $CH_2$ expressed in gmol $H_2$ / gmol $SmCo_5$ is plotted on the horizontal axis and the coercive force is plotted on the vertical axis. The gas pressure and the time required to give the relevant material a given hydrogen content was between 0 and 20 atm. and between 0 and 1 hour, respectively.

When the gas pressure is removed, the coercive force reassumes its original value after approximately 1 hour.

It is thus possible to reduce the coercive force of $SmCo_5$ from 1200 Oe to 400 Oe by exposing it to hydrogen gas under pressure. A master tape provided with this material can thus be written in that condition and after removing the hydrogen gas pressure it may be used in anhysteretically copying the information recorded on it on a high-coercive slave.

What is claimed is:

1. A method of copying magnetic recordings provided onto a first magnetisable recording medium on a second magnetisable recording medium comprising the steps of recording on the first magnetisable medium while in a state of reduced coercivity, thereafter increasing the coercive force of the first magnetisable medium to a value, $H_{c1}$, said first medium consists of a magnetic material having the general formula $M_5R$, wherein M is at least one transfer metal of the first long period and R is at least one rare earth metal, said medium, before providing the recordings to be copied on it, being subjected to hydrogen gas under pressure to reduce the coercive force thereof, the hydrogen gas pressure being removed before copying is carried out to increase the coercive force of said first magnetizable medium, contacting the magnetic surfaces of the first magnetisable medium in a state of higher coercivity with the recording thereon and of the second magnetisable medium with each other, subjecting said magnetizable mediums while the surfaces thereof are in contact with one another to a magnetic auxiliary field to form on the second magnetizable medium a duplicate of the recording on the first magnetizable medium, and then separating said magnetizable mediums from each other, the coercive force $H_{c1}$, the coercive force $H_{c2}$ of the second magnetisable medium and the field strength H of the magnetic auxiliary field fulfilling the requirement: $aH_{c2} < H < (H_{c1})/a$ with $1 < a < 2$.

2. A method of copying magnetic recordings provided on a first magnetizable recording medium onto a second magnetizable medium while in a state of reduced coercivity, thereafter increasing the coercive force of the first magnetizable medium to a value, $H_{c1}$, said first magnetizable medium consists of a magnetic material having a reduced coercive force at ambient temperature and a higher coercive force at a temperature lower than ambient, said magnetic material having the formula $(Co_x Fe_{1-x})_2 O_3$, with $0.01 < x < 0.1$, the recordings to be copied being provided on the first medium at ambient temperature and copying being carried out at the lower temperature, contacting the magnetic surface of the first magnetizable medium in a state of higher coercivity with the recording thereon and of the second magnetizable medium with each other, subjecting said magnetizable mediums while the surfaces thereof are in contact with one another to a magnetic auxiliary field to form on the second magnetizable medium a duplicate of the recording on the first magnetizable medium, and then separating said magnetizable mediums from each other, the coercive force $H_{c1}$, the coercive force $H_{c2}$ of the second magnetizable medium and the field strength H of the magnetic auxiliary field fulfilling the requirement: $aH_{c2} < H < 1/aH_{c1}$ with $1 < a < 2$.

* * * * *